"

US006248138B1

(12) United States Patent
Lafave et al.

(10) Patent No.: US 6,248,138 B1
(45) Date of Patent: Jun. 19, 2001

(54) ACTIVATION AND SEALING OF STORAGE BATTERIES

(75) Inventors: Richard Lafave, Santa Fe, NM (US); Marc W. Rogers, Las Vegas, NV (US); Bruce Everett Lasley, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/328,852

(22) Filed: Jun. 9, 1999

(51) Int. Cl.[7] ................................................. H01M 6/00
(52) U.S. Cl. .............................. 29/623.1; 429/72; 429/74; 429/80
(58) Field of Search ............................... 429/72, 74, 78, 429/79, 80, 118, 51, 95, 84; 29/623.2, 623.1

(56) References Cited

U.S. PATENT DOCUMENTS

| | | | |
|---|---|---|---|
| 3,874,934 | * 4/1975 | Zangrando | 136/162 |
| 3,877,996 | * 4/1975 | Belletete | 136/60 |
| 3,911,972 | * 10/1975 | Hubers et al. | 141/7 |
| 4,696,874 | * 9/1987 | Tadiello | 429/64 |
| 5,738,690 | * 4/1998 | Hughett et al. | 29/623.1 |
| 5,853,913 | * 12/1998 | Stocchiero | 429/63 |
| 5,902,694 | * 5/1999 | Landau | 429/64 |

* cited by examiner

Primary Examiner—Gabrielle Brouillette
Assistant Examiner—R Alejandro
(74) Attorney, Agent, or Firm—Margaret A. Dobrowitsky

(57) ABSTRACT

An apparatus and method for activating and sealing a storage battery in an uncontrolled atmosphere. A tubular structure is coupled to a fill port of the battery, the battery is evacuated by connecting the tubular structure to a source of vacuum, and the battery is thereafter filled by connecting the tubular structure to a source of pressurized electrolytic fluid. After the battery has been evacuated and filled, a check valve, slideably positioned in the passage through which the battery has been evacuated and thereafter filled is driven along the passage into a press fit with a valve seat defined proximate the fill port of the battery to seal the battery from contaminants while allowing escape of gas from the interior of the battery housing.

10 Claims, 5 Drawing Sheets

ACTIVATION AND SEALING OF STORAGE BATTERIES

FILED OF THE INVENTION

This invention relates to storage batteries and more particularly to an improved apparatus and method for activating and sealing storage batteries.

BACKGROUND OF THE INVENTION

After construction of a storage battery it is necessary to activate the battery by the addition of an atmosphere sensitive electrolyte. Battery components must not be exposed to an uncontrolled atmosphere since electrolyte absorbs moisture during even short periods of exposure to the atmosphere, with consequent degradation of the performance of the battery. In order to avoid exposure of the electrolyte to atmosphere during the activation process, it is customary to perform all work relating to the activation process, in a controlled atmosphere. Specifically, batteries are positioned in a glove box regulated to less than 25 ppm moisture, the batteries are activated by the addition of electrolyte, and the batteries are sealed and thereafter removed from the glove box. After a period of time, usually within one week, the batteries are again positioned in the controlled atmosphere of the glove box, opened to allow the gas that has built up to escape, and then resealed. This prior art activation process, while generally satisfactory with respect to achieving satisfactory activation of the battery, is both time consuming and tedious. Specifically, in a mass production environment it is necessary to constantly bring materials into and out of the glove box while maintaining a carefully controlled atmosphere in the glove box.

SUMMARY OF THE INVENTION

This invention is directed to the provision of an improved method and apparatus for activating and sealing storage batteries.

More specifically, this invention is directed to the provision of an improved method and apparatus for activating and sealing storage batteries that does not require the use of controlled atmospheres.

According to the invention methodology, a coupling surface is provided on the battery housing proximate a fill port of the battery; an activation fixture is provided including a tubular structure, defining an axial passage opening in a free end. The tubular structure, and a check valve slideably positioned in the passage at a location remote from the free end; the free end of the tubular structure is coupled to the coupling surface to position the passage coaxial with the fill port. The interior of the battery housing is evacuated through the fill port and the passage and electrolyte is injected into the interior of the battery housing through the passage and the fill port. The check valve is moved along the axial passage to a position in overlying, sealing relation to the fill port. The free end of the tubular structure is decoupled from the coupling surface and the fixture is removed from the battery housing while leaving the check valve in overlying, sealing relation to the fill port. This methodology allows the activation and sealing of the battery to take place in an uncontrolled atmosphere.

According to a further feature of the invention method, a check valve seat is defined on the housing structure proximate the fill port and the check valve is driven into the check valve seat to fixedly position the check valve in overlying, sealing relation to the fill port. This arrangement facilitates the installation of the check valve in a sealing position with respect to the fill port.

In another aspect, the fixture includes a drive rod having an inboard end positioned slideably in the passage and an outboard end projecting outwardly from another end of the tubular structure. The check valve is positioned in the passage between the rod inboard end and the free end of the tubular structure; and the step of moving the check valve along the passage comprises driving the drive rod into the passage to move the check valve along the passage and drive the check valve into the check valve seat. This arrangement facilitates the movement of the check valve into sealing relationship with respect to the fill port.

The activation and sealing fixture includes a tubular structure defining an axial passage opening in a free end of the tubular structure; a check valve slideably positioned in the passage at a location removed from the tubular structure free end; means at the free end of the tubular structure to facilitate coupling of the tubular structure free end to the battery housing in surrounding relation to a fill port of the battery and with the passage coaxial with the fill port; and means for moving the check valve slideably along the passage to the free end of the tubular structure. This arrangement allows the check valve to be positioned in overlying, sealing relation to the fill port with the tubular structure free end coupled to the battery housing structure. This simple fixture arrangement allows the battery to be activated and sealed without the use of controlled atmosphere devices.

According to a further feature of the invention, the fixture further includes a plumbing assembly operative to alternately connect the passage to a source of vacuum, to facilitate evacuation of the battery through the fill port and through the passage, and connect the passage to a source of electrolyte, thereby to allow injection of electrolyte into the evacuated battery through the passage and the fill port.

According to a further feature of the invention, the plumbing assembly communicates with the passage at a location between the check valve and the free end of the tubular structure. This arrangement allows the battery to be evacuated and thereafter filled with the check valve in a rest or retracted position, whereafter the check valve may be driven to its sealing position with respect to the fill port of the battery.

According to a further feature of the invention, the plumbing assembly includes a first valve adapted to control connection to the vacuum source and a second valve adapted to control connection to the electrolyte source. This specific valving arrangement facilitates the sequential evacuation and filling of the battery.

According to a further feature of the invention, the activation fixture further includes a coupling member adapted to be positioned in an outer wall of the battery housing, and the coupling member is configured to define the fill port for the battery, the valve seat to receive the check valve, and the coupling surface to facilitate coupling of the fixture to the battery. In the disclosed embodiment of the invention, the check valve seat is in concentric, overlying relation to the fill port and the coupling surface is in concentric, surrounding relation to the valve seat.

According to a further feature of the invention, the activating fixture further includes a coupling ring positioned on the free end of the tubular structure and coacting with the coupling surface to couple the free end of the tubular structure to the coupling member. This specific coupling arrangement facilitates the ready and effective coupling and decoupling of the fixture with respect to the battery.

BRIEF DESCRIPTION OF THE DRAWINGS

FIG. 6 is a fragmentary, cross-sectional view of the fixture; and

FIG. 7 is a fragmentary, perspective view of a battery following completion of the activating and sealing operation utilizing the fixture.

DETAILED DESCRIPTION OF THE PREFERRED EMBODIMENT

Figure 1:
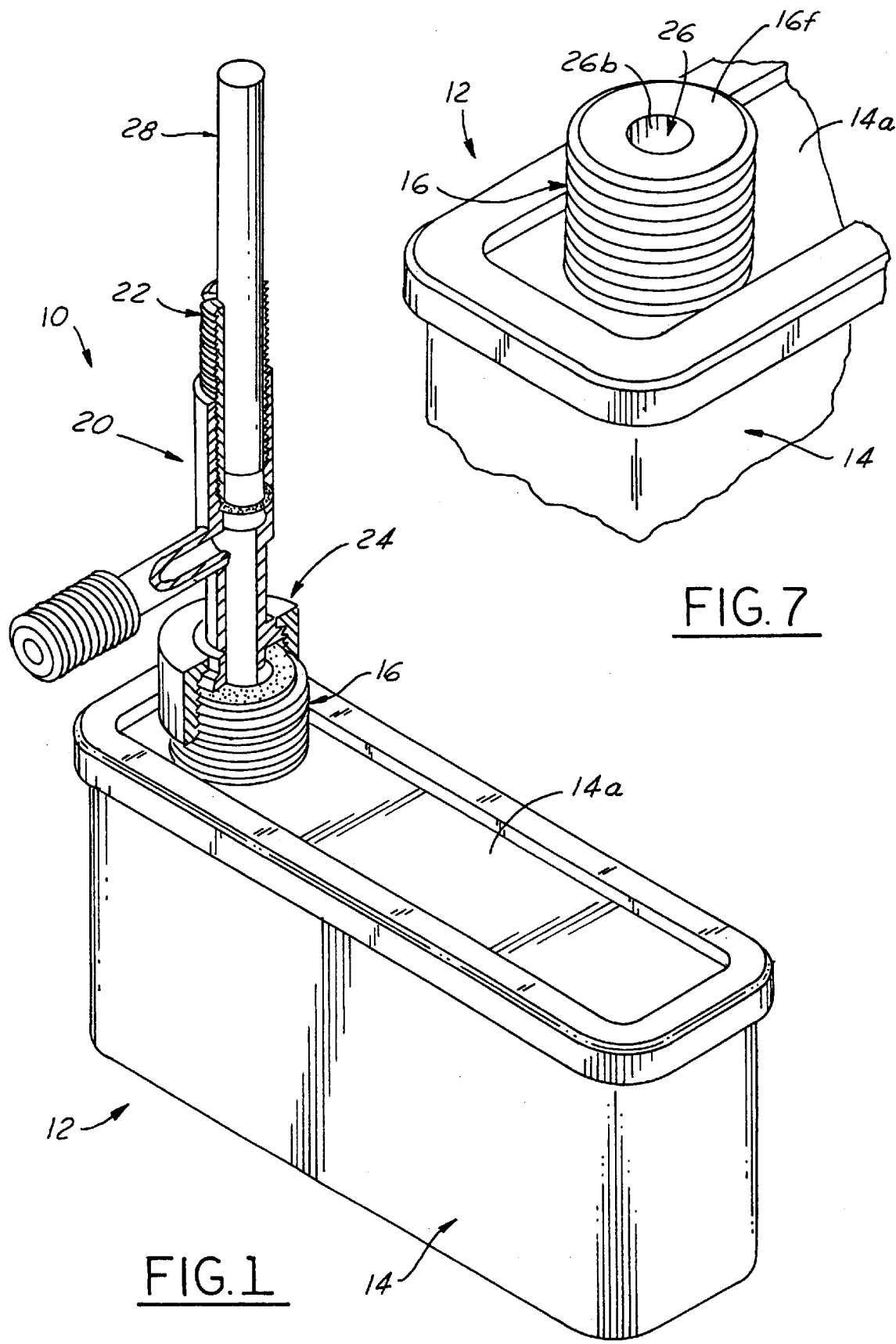
FIG. 1 is a perspective, cross-sectional view of a fixture according to the invention shown coupled to a storage battery.
Figure 2:
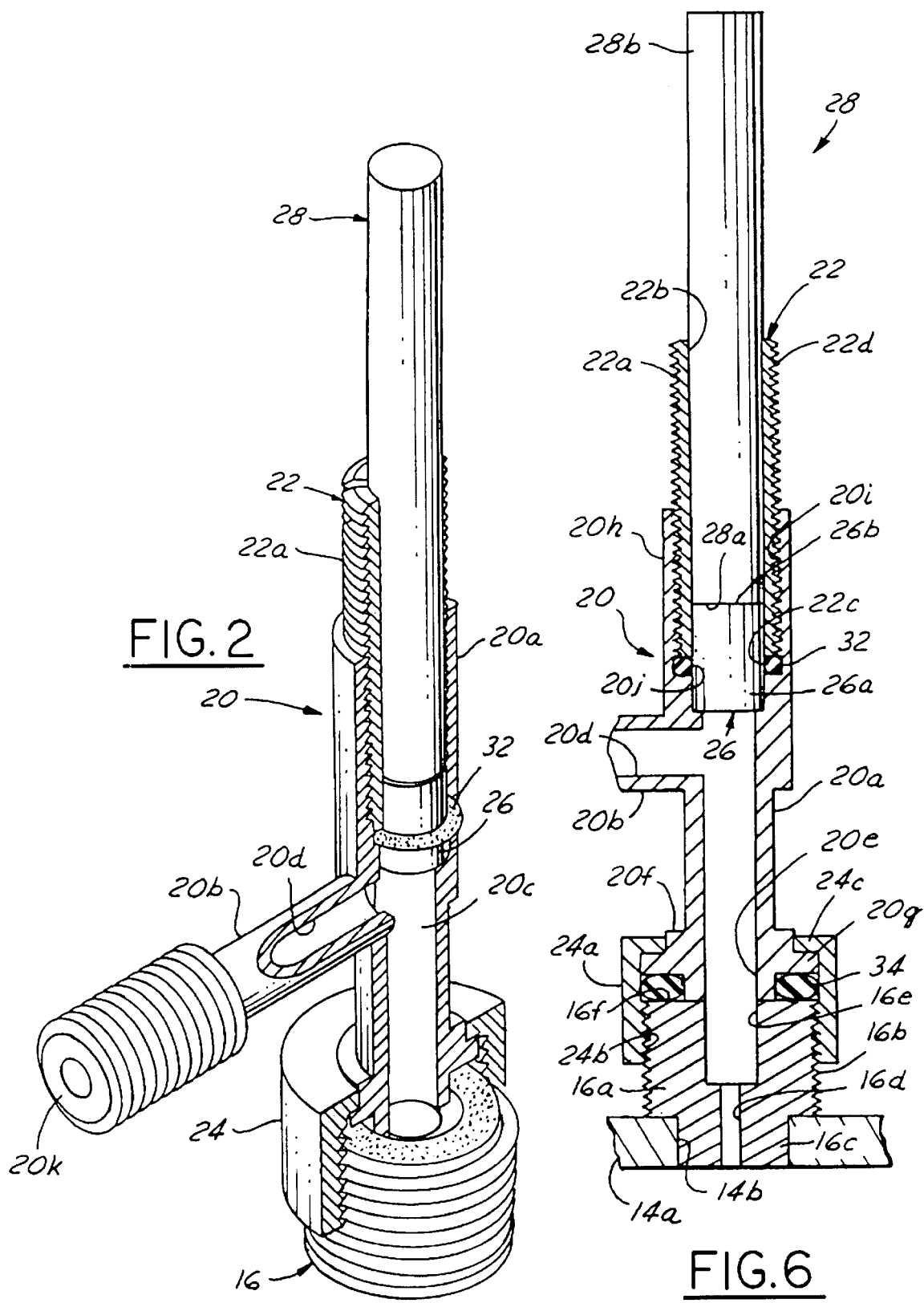
FIG. 2 is a view similar to FIG. 1 but showing the fixture disassociated from the battery.
Figure 3:
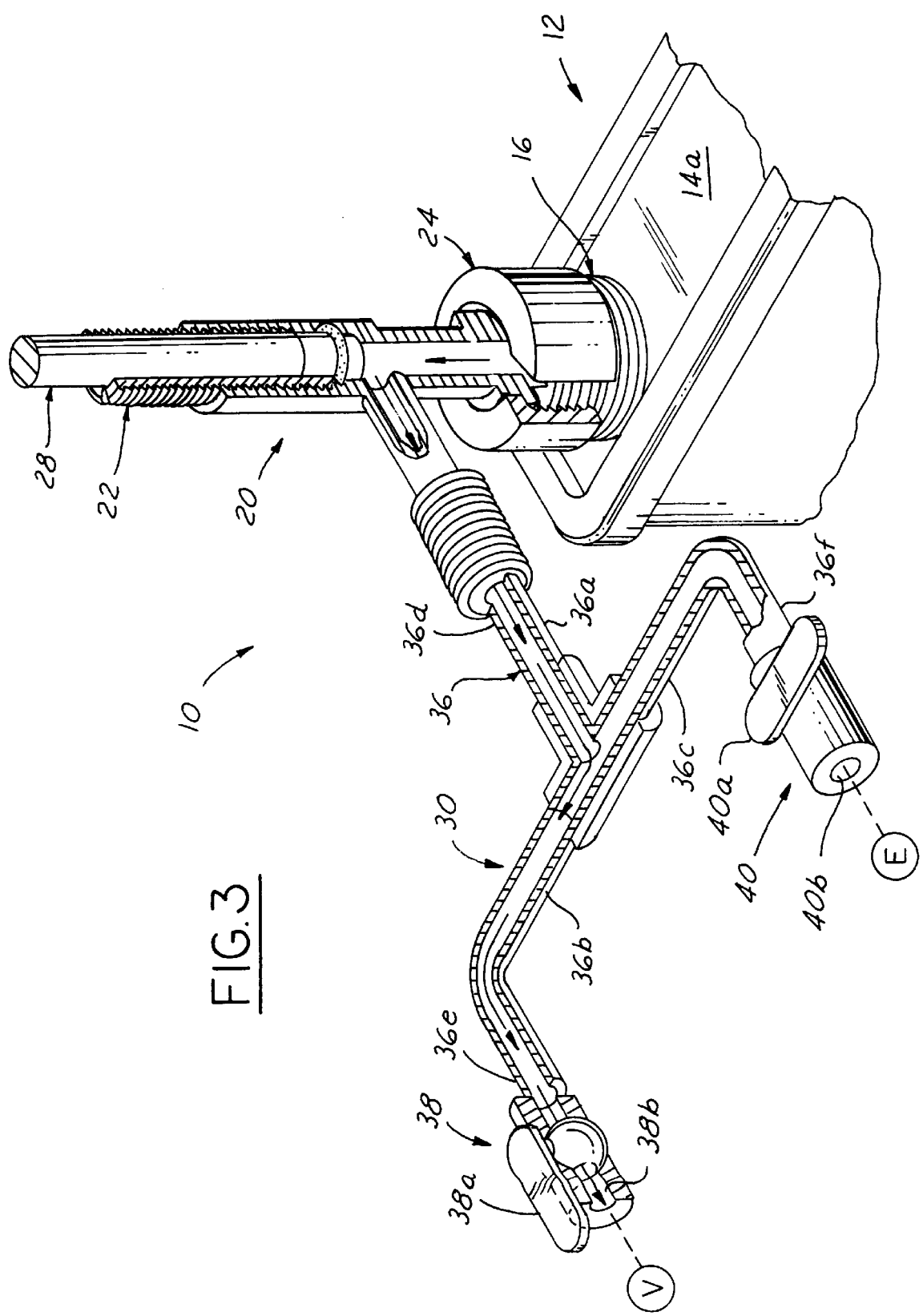
FIG. 3 is a view similar to FIG. 1 but further including a plumbing assembly forming a part of the fixture and shown in a mode for evacuating the battery.
Figure 4:
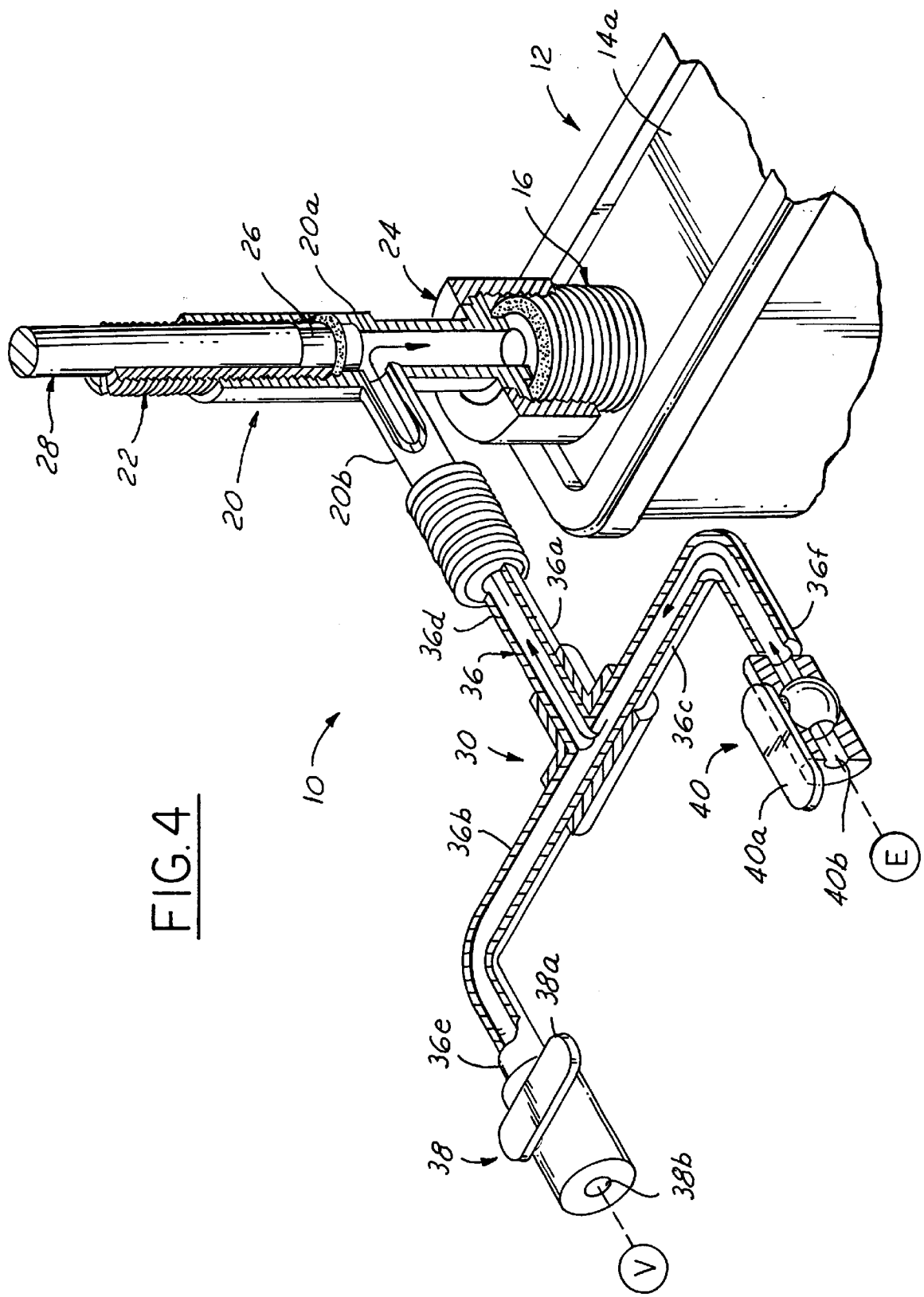
FIG. 4 is a view similar to FIG. 3 but showing the plumbing assembly in a mode for filling the battery.

The activation and sealing fixture 10 of the invention is seen in FIGS. 1, 3, and 4 in association with a battery 12 including a housing 14 defining a top wall 14a. It will be understood that battery 12 includes the usual internal components and that following assembly of the battery the battery is activated by the addition of an electrolytic fluid inserted into the interior of the battery housing through a fill port in the battery housing. The fixture 10 of the invention is adapted to facilitate the addition of the activating electrolyte to the battery without resort to the use of controlled atmosphere devices.

Figure 5:
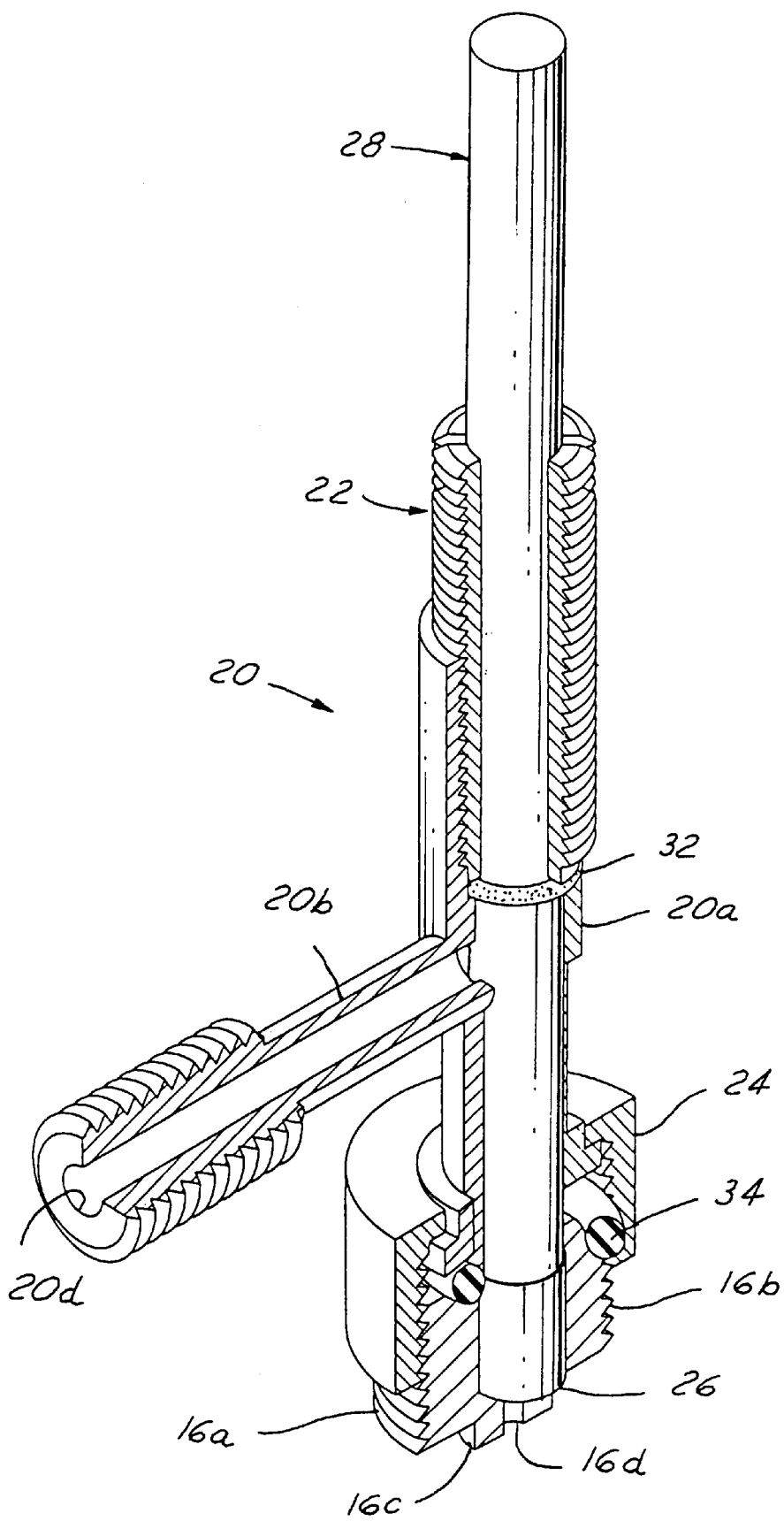
FIG. 5 is a view similar to FIG. 2 but showing the fixture in a battery sealing configuration.

Fixture 10 includes a coupling member 16; a main housing 20; a tubular screw 22; a pull-down ring 24; a check valve 26 (FIGS. 5 and 6); a drive rod 28; and a plumbing assembly 30.

Unless otherwise indicated it will be understood that all components of the fixture are formed of a suitable material that is non-reactive with respect to the electrolyte to be added to the battery.

Coupling member 16 (FIGS. 5 and 6) includes a main body cylindrical portion 16a, having external threads 16b, and a pilot portion 16c. Coupling member 16 includes a central bore 16d and a counter bore 16e. Coupling member 16 is secured to the top wall 14a of the battery housing by positioning the pilot portion 16c in an opening 14b in the upper wall 14a of the battery housing and suitably securing the coupling member to the upper wall of the housing. With the coupling member thus positioned on the upper wall of the battery housing, the central bore 16d of the coupling member will be seen to define a fill port communicating with the interior of the battery housing.

Main housing 20 (FIGS. 1–6) is a tubular structure of T-configuration including a vertical pipe 20a and a horizontal pipe 20b. Vertical pipe 20a defines a central, vertical passage 20c and horizontal pipe 20 defines a central, horizontal passage 20d connecting with vertical passage 20c. The lower free end 20e of pipe 20a is provided with an external flange or collar including a hub portion 20f and a flange portion 20g. The upper free end portion 20h of pipe 20a is internally threaded at 20i to form an upwardly opening threaded bore.

Tubular screw 22 (FIGS. 1–6) is externally threaded at 22a and is sized to be threaded into the upwardly opening threaded bore defined by the upper end of pipe 20a in coaction with internal threads 20i. The central passage 22b defined by tubular screw 22 corresponds in diameter to the diameter of passage 20c so that passage 22b forms an axial continuation of passage 20c. An elastomeric O-ring 32 is positioned between an annular internal shoulder 20j proximate the lower end of internal threads 20i and the lower annular edge 22c of tubular screw 22 so that tightening threaded movement of tubular screw 22 with respect to pipe 20a has the effect of compressing elastomeric ring 32.

Pull down ring 24 (FIGS. 1–6) has a split configuration and is sized to fit around the lower free end of 20e of pipe 20a for coaction with flange 20g and an elastomeric sealing ring 34. Specifically, pull down ring 24 includes a main body cylindrical portion 24a, having internal threads 24b, and an upper annular lip portion 24c adapted to fit around hub portion 20f and rest upon flange portion 20g. To couple main housing 20 to coupling member 16, first, the lower free end 20e of the main housing is positioned proximate the upper annular face 16f of coupling member 16 with elastomeric member 34 positioned between surface 16f and flange 20g. Then, ring 24 is pulled downwardly over coupling member 16 to engage internal threads 24b with the coupling surface defined by external threads 16b while compressing elastomeric ring 34 between flange 20g and surface 16f. Ring 24 may be turned relative to coupling member 16 to further threadably tighten the coupled joint formed between main housing 20 and the coupling member.

Check valve 26 is of known construction and has a cylindrical configuration sized to fit slideably within the passage defined by bores 20c/22b. In its withdrawn or retracted position as seen in FIGS. 1, 2, 3, 4, and 6, check valve 26 is positioned above passage 20d with its outer periphery 26a in sealing engagement with O-ring 32.

Drive rod 28 (FIGS. 1–6) has a cylindrical configuration and is initially positioned within the bore or passage 22b of tubular screw 22 with the lower or inboard end 28a of the rod positioned in confronting relation to the upper cylindrical face 26b of the check valve and the outboard or upper end 28b of the rod projecting outwardly from the upper end 22b of tubular screw 22.

Plumbing assembly 30 (FIGS. 3 and 4) includes a piping structure 36, a vacuum control valve 38, and an electrolyte fill control valve 40. Piping structure 36 has a T-configuration including a central stem portion 36a, a vacuum branch portion 36b, and an electrolyte branch portion 36c. The free end 36d of stem portion 36a is adapted to be coupled to the free end 20k of pipe 20b so as to form a continuous passage with passage 20d. Vacuum control valve 38 is of conventional construction and communicates with the free end 36e of branch portion 36b. Valve 38 includes a control handle 38a and an outlet 38b communicating with a vacuum source V. Electrolyte fill control valve 40 communicates with the free end 36f of branch 36c and includes a control handle 40a and an outlet 40b communicating with a source of pressurized electrolytic fluid E.

OPERATION

Following the construction of the battery in known manner, the battery is activated and sealed in the following manner utilizing the fixture 10 of the invention. Coupling member 16 is suitably secured to the upper wall 14a of the battery with the pilot portion 16c positioned in battery wall opening 14b so that the central bore 16d constitutes a fill port for the battery, the counter bore 16e constitutes a seat for the check valve 26, and the external threads 16b constitute a coupling surface. Thereafter, the lower end 20e of main housing 20 is positioned proximate the upper face 16f of coupling member 16 and ring 24 is pulled downwardly over the coupling member and turned threadably relative to the coupling member to compress the elastomeric O-ring 34 between flange 20g and coupling member surface 16f. Thereafter valve 38 (FIG. 3) is opened with valve 40 closed to connect the fixture 10 with the source of vacuum V and evacuate the interior of the battery through pipe branch portion 36b, pipe stem portion 36a, passage 20d, passage 20c, and fill port 16d. Thereafter, valve 38 is closed and valve 40 is opened to communicate the fixture with the source E of pressurized electrolytic fluid whereby electrolytic fluid is injected into the interior of the battery through pipe branch portion 36c, pipe stem portion 36a, passage 20d, passage 20c, and fill port 16d. Thereafter, drive rod 28 is suitably moved downwardly to drive check valve 26 downwardly in passage 20c and seat the check valve with a press fit in valve seat 16e thereby to seal the fill port 16d. Thereafter, ring 24 is turned and lifted relative to coupling member 16 to decouple the fixture from the battery preparatory to the use of the fixture to activate and seal another battery. It will be understood that, with the check valve 26 press fit into seat 16e, the check valve functions in known manner to allow the escape of gas from the interior of the battery while precluding the entry of contaminants into the interior of the battery. It will further be understood that various fixturing devices (not shown) are utilized to facilitate the coupling and decoupling of the fixture to each battery and to determine the extent of inward movement of the drive rod required to provide proper seating of the check valve.

The invention will be seen to provide an improved method and apparatus for activating and filling a storage battery. More specifically, the invention will be seen to provide a method of activating and filling a storage battery that enables the entire activation and sealing process to be carried out in a normal atmospheric environment and without the use of controlled atmospheric environment devices or techniques.

Whereas a preferred embodiment of the invention has been illustrated and described in detail, it will be apparent that various changes may be made in the disclosed embodiment without departing from the scope or spirit of the invention.

What is claimed is:

1. A method of activating and sealing a storage battery having a housing with an opening communicating with the interior of the housing for filling the battery with electrolyte, the method comprising:

providing a coupling member adjacent the opening of the housing the coupling member having a fill port in communication with the interior of the housing;

providing an activation fixture including a tubular structure defining a first passage with an opening in a free end of the tubular structure;

coupling the free end of the tubular structure to the coupling member to position the first passage coaxial with the fill port;

positioning a check valve in the first passage at a location spaced apart from the free end;

evacuating the interior of the battery housing through the fill port and the first passage;

injecting electrolyte into the interior of the battery housing through the first passage and the fill port;

moving the check valve along the first passage to a position in the coupling member in sealing relation to the fill port; and decoupling the free end of the tubular structure from the coupling member and removing the fixture from the battery housing while leaving the check valve in sealing relation to the fill port.

2. A method according to claim 1 wherein:

a check valve seat is defined in the coupling member over the fill port; and moving the check valve includes driving the check valve into the check valve seat to fixedly position the check valve over the fill port to thereby seal the fill port.

3. A method according to claim 2 further comprising:

providing a drive rod in the activation fixture, the drive rod having an inboard end positioned slideably in the first passage and an outboard end projecting outwardly from another end of the tubular structure;

wherein positioning the check valve includes placing the check valve in the first passage between the rod inboard end and the free end of the tubular structure; and wherein the step of moving the check valve along the first passage comprises driving the drive rod into the first passage to move the check valve along the first passage and drive the check valve into the check valve seat.

4. A method according to claim 1 further comprising:

providing a second passage in the activation fixture between the free end of the tubular structure and the check valve in its spaced apart position, the second passage communicating with the first passage and operative to alternately connect the first passage to a vacuum source to effect the step of evacuating and to an electrolyte source to effect the step of injecting.

5. A method according to claim 4 further comprising:

providing a first valve in the second passage operative to connect and disconnect the first passage relative to the vacuum source; and providing a second valve in the second passage operative to connect and disconnect the first passage relative to the electrolyte source.

6. A method according to claim 1 further comprising providing a coupling ring positioned on the free end of the tubular structure and coacting with a coupling surface on the coupling member to couple the free end of the tubular structure to the coupling member.

7. A method of activating and sealing a storage battery having a housing with an opening communicating with the interior of the housing for filling the battery with electrolyte, the method comprising:

providing a coupling member in the opening of the housing, the coupling member including a first axial bore in communication with the housing opening and defining an electrolyte fill port, and a second axial bore in communication with and concentric with the first axial bore, the second axial bore defining a valve seat for positioning a valve in sealing relation over the first axial bore;

providing an activation fixture including a tubular structure defining a first passageway and a second passageway, and a check valve slidable within the first passageway, wherein the first passageway includes a first opening in a free end of the tubular structure and a second opening in an axially opposite end of the tubular structure, and wherein the second passageway is positioned between the first and second openings and is operatively coupled to an electrolyte source and to a vacuum source;

coupling the free end of the tubular structure to the coupling member to position the first passageway coaxial with the valve seat and the fill port;

positioning the check valve in the first passageway at a location between the second passageway and the second opening of the tubular structure;

evacuating the interior of the battery housing through the fill port and the first passageway via the vacuum source coupled to the second passageway;

injecting electrolyte into the interior of the battery housing through the first passageway and the fill port via the electrolyte source coupled to the second passageway;

moving the check valve along the axial passageway into the valve seat in the coupling member to thereby seal the fill port; and decoupling the free end of the tubular structure from the coupling member and removing the fixture from the battery housing while leaving the check valve in sealing relation to the fill port.

8. A method according to claim 7 further comprising inserting a drive rod into the second opening of the tubular structure, and moving the check valve into the valve seat by pushing the valve with the rod.

9. A method according to claim 7 further comprising:

providing a first valve in the second passageway operative to connect and disconnect the first passageway relative to the vacuum source;

providing a second valve in the second passageway operative to connect and disconnect the first passageway relative to the electrolyte source.

10. A method according to claim 7 further comprising providing a coupling ring positioned on the free end of the tubular structure and coacting with a coupling surface on the coupling member to couple the free end of the tubular structure to the coupling member.

* * * * *